Nov. 6, 1928.
W. A. JONES
1,690,981
VEHICLE WHEEL RIM
Filed April 11, 1925
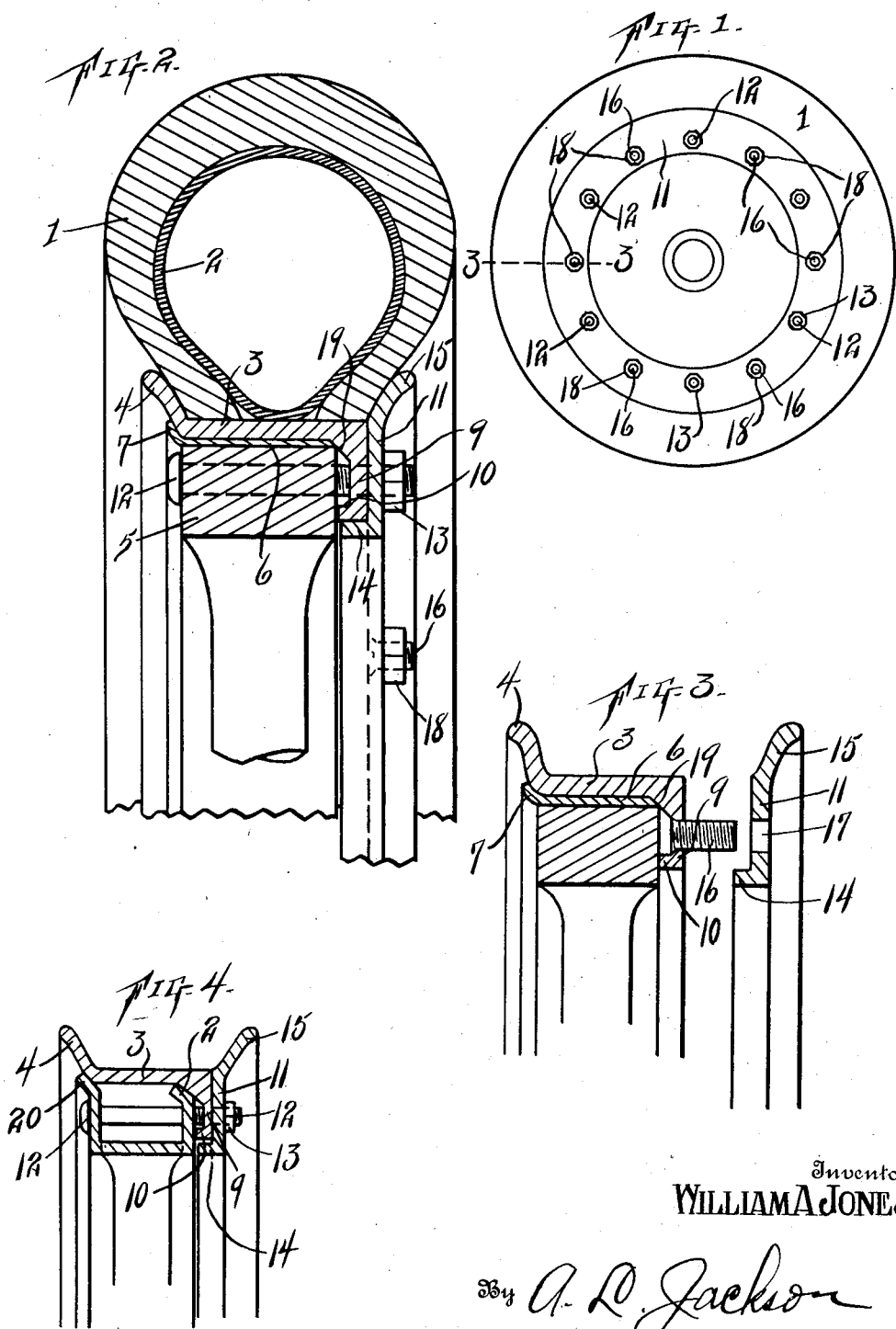
Inventor
WILLIAM A. JONES.
By A. L. Jackson
Attorney Patented Nov. 6, 1928.

1,690,981

UNITED STATES PATENT OFFICE.

WILLIAM A. JONES, OF FORT WORTH, TEXAS, ASSIGNOR TO NATIONAL VEHICLE RIM CORPORATION.

VEHICLE WHEEL RIM.

Application filed April 11, 1925. Serial No. 22,445.

My invention relates to wheel rims and more particularly to wheels for vehicles; and the object is to provide a rim on which it is easy to mount a tire, to provide a rim which has greater strength, to provide a rim that is not severed at any point and which is provided with a detachable member which is not severed at any point and which adds strength to the main rim, and to provide a rim which has greater traction in proportion to the size of the wheel and which is simple in construction and which can be manufactured economically and which eliminates the lugs commonly used in assembling a tire on a wheel. Other objects and advantages will be fully explained in the following description and the invention will be more particularly pointed out in the claims.

Reference is had to the accompanying drawings which form a part of this application.

Fig. 1 is a side elevation of a wheel equipped with the improved rim. Fig. 2 is a cross-section of a wheel rim and tire, showing the improved rim in section. Fig. 3 is a section of the rim, taken on the line 3—3 of Fig. 1. Fig. 4 is a broken cross-section, showing a steel felly instead of the wooden felly shown in the previous views.

Similar characters of reference are used to indicate the same parts throughout the several views.

The drawings show a tire 1 and inner tube 2 and wheel rim 3 which has an integral annular flange 4 which is curved outwardly to engage the tire 1. The wheel felly 5 is provided with a metallic band 6 attached thereto in the usual manner. The band 6 has a flange 7 to prevent the displacement of the tire laterally. The rim 3 has an inwardly projecting annular flange 9 for bracing and strengthening the felly 5. The flange 9 is spaced from the felly 5 by a lateral annular flange 10. The wheel is provided with a detachable rim member 11 which is bolted to the felly 5 and flange 9 by bolts 12. The rim member 11 has an inwardly projecting annular flange 14 which engages the inner edges of the flanges 9 and 10. When the rim member 11 is bolted on the felly 5 and the flange 9, the rim member 11 will be rigidly locked to the felly 5 and flange 9 by the bolt 12 and nuts 13 and by the inwardly or laterally projecting flange 14. The flange 9 and the rim member 11 brace the wheel both laterally and radially and so add great strength to the wheel. The rim member 11 has a flange 15 for engaging the tire.

The flange 9 is provided with centering lugs 16 which are brazed thereto or screwed therein. The rim member 11 has holes 17 therein to receive the centering lugs 16. This provision facilitates the mounting or assembling of the wheel rims and the strength of the wheel is much increased because the flange 9 and the rim member 11 are firmly locked together. Bolts 18 may be screwed on the studs 16.

The ring or body 3 has an inclined portion 19 which serves to wedge the parts close together in assembling the parts. The spacing of the flange 9 from the felly also makes provision for wedging the parts of the felly and the ring 3 together.

Figs. 2 and 3 show the felly made of wood. The felly may be made of steel, as shown in Fig. 4. The construction of the other features are the same as in previous views except the ring 6 is omitted and inclined flanges 20 are formed on the outer periphery of the steel felly.

What I claim, is,—

1. A wheel rim comprising an annular body or ring engaging the outer periphery of the wheel felly and provided with an inwardly projecting annular flange having an annular laterally projecting flange engaging the side of the felly and forming a vacancy for wedging action, said ring having an annular inclined radial flange projecting outwardly for engaging and holding a tire on the ring, said body having an inner inclined surface at the juncture of said inwardly projecting flange, a band attached to the felly and provided with an outwardly projecting inclined flange for co-operating with said inclined surface of said body, a detachable rim member engaging said inwardly projecting flange and having a lateral flange engaging the inner periphery of said first named flange, and bolts for locking said rim member to the wheel felly and to said inwardly projecting flange and for causing a tightening of said co-operating inclined members.

2. A wheel rim comprising an annular body or ring engaging the outer periphery of the wheel felly and provided with a flange projecting radially inwardly and having an annular laterally projecting flange engaging the felly and spacing the inwardly projecting flange from the felly and making a vacancy for wedging purposes, a detachable rim member engaging said inwardly projecting flange and provided with a laterally projecting flange engaging the first named flange and engaging the inner periphery of said first named lateral flange, said ring and said rim member having annular outwardly inclined flanges for engaging and holding a tire on the wheel, bolts for binding said felly and inwardly projecting flange and said rim member together, and centering studs rigid with said inwardly projecting flange for mounting said rim member on the wheel.

In testimony whereof, I set my hand, this 21st day of March, 1925.

WILLIAM A. JONES.